Aug. 5, 1924.　　　　　　　　　　　　　　　　1,504,083
J. L. SHROYER
ELECTRIC HEATER
Filed June 14, 1922

Inventor:
Jacob L. Shroyer,
by Albert G. Davis
His Attorney.

Patented Aug. 5, 1924.

1,504,083

UNITED STATES PATENT OFFICE.

JACOB L. SHROYER, OF CHICAGO, ILLINOIS, ASSIGNOR TO EDISON ELECTRIC APPLIANCE COMPANY, INC., A CORPORATION OF NEW YORK.

ELECTRIC HEATER.

Application filed June 14, 1922. Serial No. 568,233.

*To all whom it may concern:*

Be it known that I, JACOB L. SHROYER, a citizen of the United States, residing at Chicago, in the county of Cook, State of Illinois, have invented certain new and useful Improvements in Electric Heaters, of which the following is a specification.

My invention relates to electric heaters, and more particularly, to electric ranges, and has for its object the provision of means for mounting the control devices so that they will not be subjected to extreme temperatures during the operation of the range.

My invention is particularly applicable to electric ranges which are operated at high temperatures such, for example, as ranges adapted for use in hotels. In the construction of ranges of this type it is necessary to provide means for preventing the electrical control devices, such, for example, as the switches and cutouts in circuit with the various heating elements, from being exposed to the heat conducted and radiated from the range top and the oven. Without some precautions of this character the switches and cutouts may be damaged by the excessive temperatures to which they would be subjected.

In carrying out my invention in one form I mount the control switches and cutouts in a chamber in the range provided with apertures to permit the free circulation of cooling air around the control devices.

Figure 1:
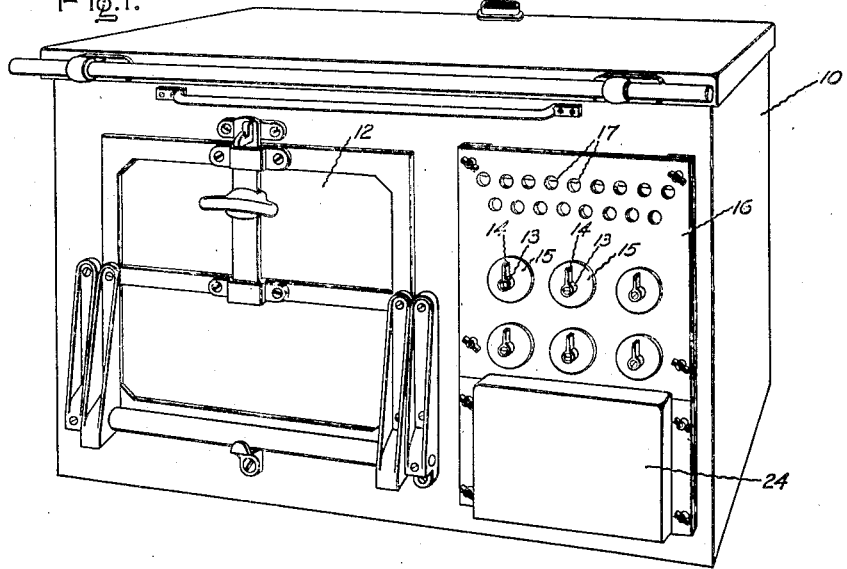
Figure 2:
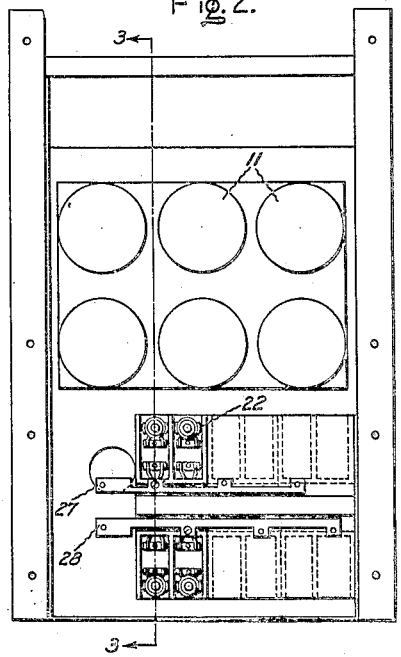
Figure 3:
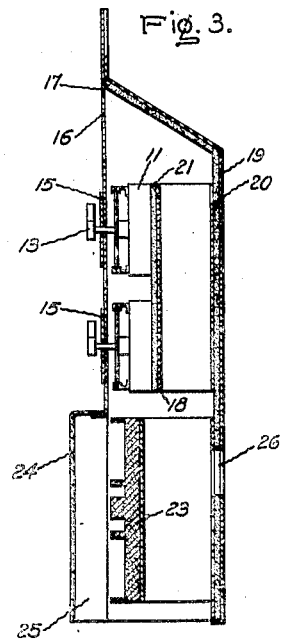
Figure 4:
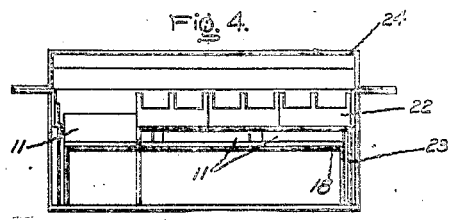

For a more complete understanding of my invention reference should be had to the accompanying drawing in which Fig. 1 shows an electric range embodying my invention; Fig. 2 is an elevation view of the chamber for the control devices with the cover plates removed; Fig. 3 is a section view along the line 3—3 of Fig. 2, but with the cover plates in place; while Fig. 4 is a view of Fig. 2 looking upward with the cover plates in place.

Referring to the drawing, I have shown my invention in one form as applied to a hotel range 10 although obviously it may be applied to various other types of electric ranges or heaters. In one form of my invention, the control switches 11 for the heating elements are located in the right hand end of the range with the oven 12 in the left-hand end. The control switches are operated by means of knobs 13 on the outside of the range. These knobs are each provided with a pointer 14 for indicating the position of the switch on a suitable dial 15, in a well-known manner. The switches are enclosed by a removable cover or plate 16 through which the switch stems extend. A plurality of apertures 17 are provided near the upper end of plate 16. The switches are mounted in the range behind plate 16 on a U-shaped metallic bracket 18 which in turn is secured in a metallic switch box 19 attached to the body of the range behind plate 16. The switch box is open at its lower end. Preferably, the switch box 19 and bracket 18 are lined with layers 20 and 21 of a suitable electrical and heat insulating material. The control switches 11 are thus mounted in spaced relation with both the supporting box 19 and the cover plate 16 so as to provide for the free circulation of cooling air around them.

The cutouts 22, which may be fusible cutouts of any well-known form, are mounted beneath the switches 11 on a supporting bracket 23 which also is secured in the switch box 19. For the purpose of providing for greater accessibility the cutouts are preferably spaced a greater distance from the switch box than the switches 11, whereby the cutouts are positioned near the front wall of the range. A detachable metallic cover box 24 secured to the range is provided for enclosing the cutouts. This cover is open at the bottom, whereby a ventilating aperture 25 is formed.

For the sake of simplicity the electrical connections have been omitted from the drawing. The supply mains leading from a suitable source of electrical supply may, for example, be conveniently brought in through an opening 26 in the switch box for connection with the buses 27 and 28. Electrical energy is supplied from the buses through cutouts 22 and switches 11 to the various heating units of the range in a well known manner.

By means of this arrangement it will be observed that the switches and cutouts are mounted in a chamber which is exposed to the heat of the range, the chamber being provided with apertures 17 and 25 at the top and bottom respectively. The cold air from the floor is thus permitted to enter the chamber through aperture 25 after which it circulates upward around the front and back of both the cutouts and the switches and then out through aperatures 17 in plate 16. The control devices for the range are thus protected from excessive temperatures due to their proximity to the range top and the oven.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. The combination with an electric heater, of a chamber exposed to the heat thereof, and circuit control means for said heater mounted in said chamber, said chamber being provided with apertures to permit the circulation of cooling air therethrough.

2. The combination in an electric range, of a chamber in said range exposed to the heat thereof, and control means for said range mounted in said chamber in spaced relation with the walls thereof, said chamber being provided with apertures to permit the circulation of cooling air around said control means.

3. The combination in an electric range, of a support in said range spaced from one of the walls thereof and forming a chamber, and circuit control means for said range mounted in said chamber, said chamber being provided with apertures to permit the circulation of cooling air around said control means.

4. The combination with an electric range, of a support in said range spaced from one of the walls thereof and forming a chamber, control switches and cutouts for said range mounted in said chamber, and removable covers enclosing said switches and cutouts in said chamber, said covers being arranged to provide apertures for said chamber to permit the circulation of cooling air therethrough.

In witness whereof, I have hereunto set my hand this 10th day of June, 1922.

JACOB L. SHROYER.